United States Patent [19]
Kaneko et al.

[11] Patent Number: 4,876,720
[45] Date of Patent: Oct. 24, 1989

[54] SPEECH RECOGNITION SYSTEM

[75] Inventors: Toyohisa Kaneko, Tokyo; Osaaki Watanuki, Kawasaki, both of Japan

[73] Assignee: International Business Machines Corporation, Armonk, N.Y.

[21] Appl. No.: 25,126

[22] Filed: Mar. 12, 1987

[30] Foreign Application Priority Data

Mar. 25, 1986 [JP] Japan ................................ 65028/86

[51] Int. Cl.$^4$ .............................................. G10L 1/00
[52] U.S. Cl. ...................................... 381/43; 381/45; 364/513.5
[58] Field of Search .................................. 381/41–43, 381/45, 51; 364/513.5

[56] References Cited

U.S. PATENT DOCUMENTS

| 4,400,788 | 8/1983 | Meyers et al. | 381/43 |
| 4,415,767 | 11/1983 | Gill et al. | 364/513.5 |
| 4,423,291 | 12/1983 | Zwicker et al. | 364/513.5 |
| 4,489,435 | 12/1984 | Moshier | 381/43 |
| 4,695,962 | 9/1987 | Goudie | 364/513.5 |

OTHER PUBLICATIONS

Kaneko, T., et al., "A Hierarchical Decision Approach to Large-Vocabulary Discrete Utterance Recognition," *IEEE Trans. Acoustics, Speech, Signal Processing*, vol. ASSP-31, No. 5, Oct. 1983, pp. 1061–1066.
Kaneko, T., et al., "Large Vocabulary Isolated Word Recognition with Linear and DP Matching," *Proc. 1983 Spring Conf. Acoustical Soc. Japan*, pp. 151–152.
Burton, D. K., et al., "A Generalization of Isolated Word Recognition Using Vector Quantization," *ICASSP* 83, pp. 1021–1024.
Fujisaki et al., "High-Speed Processing and Speaker Adaptation in Automatic Recognition of Spoken Words," *Trans. Comm. Speech Recognition, Acoustical Soc. Japan*, S80-19, Jun. 1980, pp. 148–155.
Jelinek, Frederick, "Continuous Speech Recognition by Statistical Methods," Proc. IEEE, vol. 64, No. 4, Apr. 1976, pp. 532–556.

*Primary Examiner*—Bernard Roskoski
*Attorney, Agent, or Firm*—Marc A. Block; Marc D. Schechter

[57] ABSTRACT

The invention relates to a muffler which includes a first expansion chamber, a second expansion chamber, a resonator chamber, and an inlet pipe having a first open end and a second open end. The first open end of the inlet pipe is inserted into the first expansion chamber so as to communicate with the latter. A resonator pipe runs substantially in a coaxial relationship with the inlet pipe so as to establish communication between the first expansion chamber and the resonant chamber. A return pipe is disposed between the resonator chamber and the second expansion chamber and passes through the first expansion chamber for establishing communication between the first expansion chamber and the second expansion chamber. An outlet pipe communicates with the second expansion chamber. The improvement comprises that said return pipe has an open end and is inserted with the open end into said resonator chamber, while the inserted open end thereof is sealed with a plug. A portion of the return pipe, passing through the first expansion chamber and the resonator chamber, is provided with at least a throughhole.

12 Claims, 5 Drawing Sheets

TIME $\bar{t}$ BEFORE NORMALIZATION (0~89)

TIME $t$ AFTER NORMALIZATION (0~79)

SPEECH RECOGNITION SYSTEM

FIELD OF THE INVENTION

The present invention generally relates to a speech recognition system employing a probabilistic technique and, more particularly, to a speech recognition system wherein speech recognition may be performed conveniently without deteriorating the recognition accuracy.

BACKGROUND OF THE INVENTION

As a probabilistic technique for recognizing speeches, there is known a technique using Markov models. The speech recognition using Markov models employs probabilistic models, each having a plurality of states, transitions between the states, a probability of each of the transitions occurring, and a probability of each of the labels being output in each of the transitions. For example, such a probabilistic model is provided for each word and its probability parameters are established by training. At the time of speech recognition, a label string obtained from an unknown input speech is matched with each probabilistic model, and a word of a probabilistic model having the highest probability of the label string occurring, is determined as a recognition result. Such a technique is described, for example, in an article by F. Jelinek, "Continuous Speech Recognition by Statistical Methods," Proceedings of the IEEE, Vol. 64, 1976, pp. 532-556.

The speech recognition using Markov models, however, requires a great amount of training data for establishing the probability parameters by training and also a significant amount of calculating time for training.

Other techniques in the prior art include the following:

(1) Article by T. Kaneko, et. al., "Large Vocabulary Isolated Word Recognition with Linear and DP Matching," Proc. 1983 Spring Conference of Acoustical society of Japan, March 1983, pp. 151-152.

(2) Article by T. Kaneko, et. al., "A Hierarchical Decision Approach to Large Vocabulary Discrete Utterance Recognition," IEEE Trans. on ASSP. Vol. ASSP-31, No. 5, October 1983.

(3) Article by H. Fujisaki, et. al., "High-Speed Processing and Speaker Adaptation in Automatic Recognition of Spoken Words," Trans. of the Committee on Speech Recognition, The Acoustical Society of Japan, S80-19, June 1980, pp. 148-155.

(4) Article by D. K. Burton, et. Al., "A Generalization of Isolated Word Recognition Using Vector Quantization," ICASSP 83, pp. 1021-1024.

These articles disclose dividing a word into blocks along a time axis. However, they describe nothing about obtaining label output probabilities in each of the block and performing probabilistic speech recognition based on the label output probabilities in each of the blocks.

SUMMARY OF THE INVENTION

As a consequence of the foregoing difficulties in the prior art, it is an object of the present invention to provide a speech recognition system employing a probabilistic technique, which can perform training conveniently and requires less calculating time.

In order to accomplish the above object, according to the present invention, a probability of each of a plurality of labels being produced in each of N blocks (first segments) in each of a plurality of recognition units, i.e., each of words in a vocabulary for recognition is estimated. The estimation is obtained by generating a histogram of labels in training data for each of N blocks in each of the recognition units and normalizing the histogram. An unknown input unit is also divided into N blocks (second segments) and each of these N blocks is linearly matched with each of N blocks in each of the recognition units. Then, a likelihood of a block in the unknown input unit being a matched block in a given recognition unit is calculated based on the probabilities estimated for the block in the recognition unit. Namely, the probability of each of the labels in the block in the unknown input unit occurring in the corresponding block in the recognition unit is determined, by referring to the probabilities estimated for the block in the recognition unit. Such probabilities are obtained over the block in the unknown input unit, and a likelihood for the block is then obtained, and further the likelihoods for all the blocks are summed up to obtain an overall likelihood for the recognition unit. A recognition unit having the highest overall likelihood is determined as a recognition result.

According to the present invention, since the description of label output probabilities is quite simple, they can be obtained easily by training and the calculations for recognition are simple. The matching, although it is basically performed linearly, can absorb fluctuations in time by adopting probabilistic expressions and can suppress recognition errors due to the fluctuations in time.

DESCRIPTION OF PREFERRED EMBODIMENTS

Figure 1:
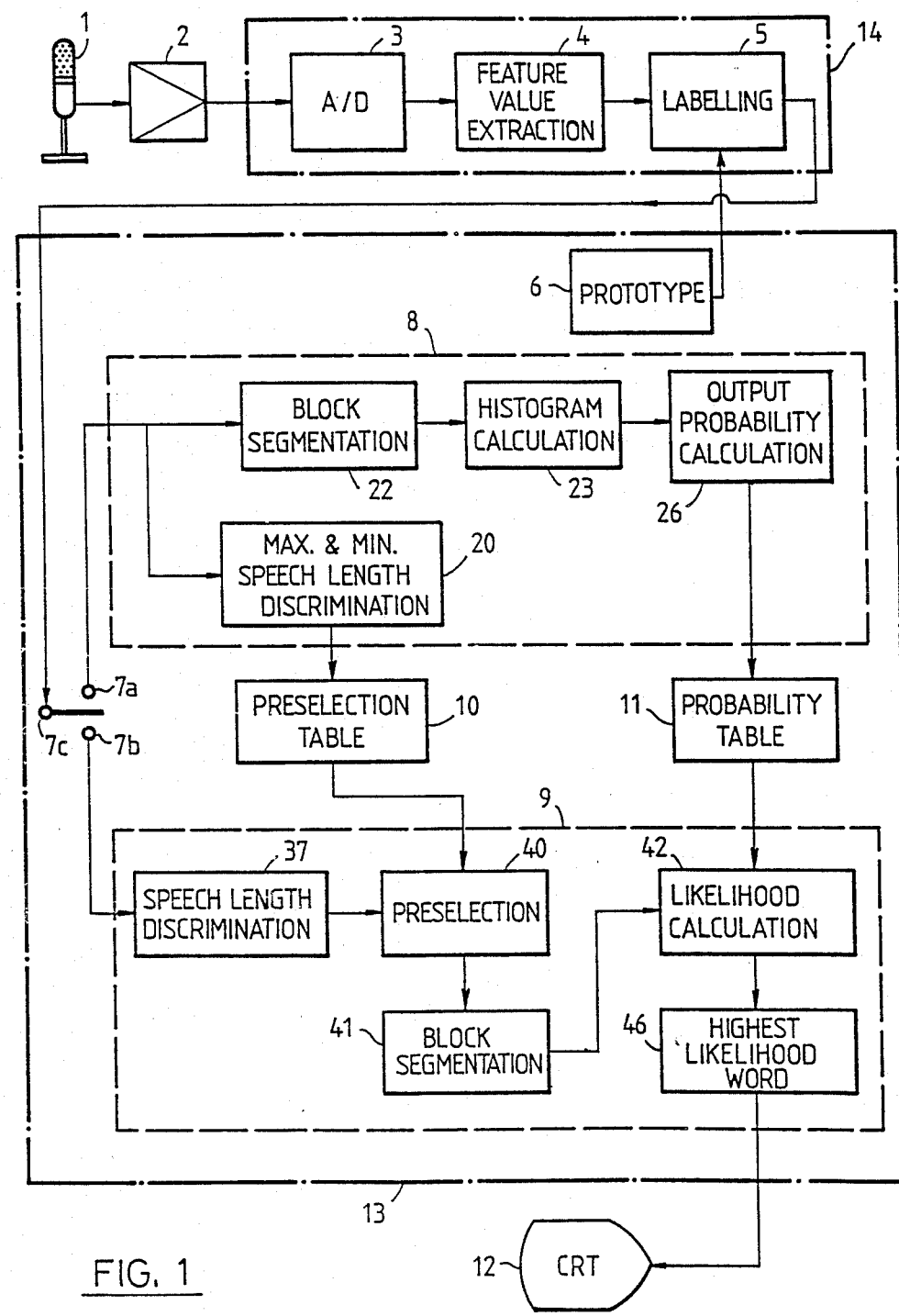
FIG. 1 shows a block diagram illustrating an embodiment of the present invention as a whole.

Now, referring to the drawings, the present invention will be explained below with respect to an embodiment thereof which is applied to an isolated word recognition system for unspecified speakers.

In FIG. 1 illustrating the embodiment as a whole, speech data is supplied to an analog/digital (A/D) converter 3 through a microphone 1 and an amplifier 2. The speech data can be training data or unknown word data. The A/D converter 3 converts the speech data into digital data by sampling it at 8 KHz. The digital data is supplied to a feature value extraction unit 4 to be converted into feature values by using linear prediction coding (LPC) analysis. Each feature value is generated every 14 nsec to be supplied to a labelling unit 5. The labelling unit 5 performs labelling with reference to a prototype dictionary 6. Namely, a label alphabet $\{f_i\}$ and prototypes of feature values corresponding thereto are stored in the prototype dictionary 6, and a label $f_i$ having a prototype which is nearest to an input feature value is discriminated and output therefrom. The number of elements of the label alphabet is 32, for example, and a prototype of a label may be obtained by sampling at random feature values in a speech spoken for 20 sec.

The label $f_i$ from the labelling unit 5 is supplied to a training unit 8 or a recognition unit 9 through a switching means 7. An input terminal 7c of the switching means 7 is connected to a switching terminal 7a for the training unit 8 during training or to a switching terminal 7b for the recognition unit 9 during recognition. The training unit 8 processes a label string obtained from the training data and establishes a preselection table 10 and a probability table 11. The preselection table 10 stores a maximum speech length L(i) and a minimum speech length l(j) for each word in the vocabulary for recognition. The probability table stores a probability p (i, j, k) of each of the labels $f_i$ being output in each of blocks $b_{jk}$ obtained by equally dividing a word $w_j$ in a vocabulary for recognition. In fact, for convenience of calculations, log p is stored in the probability table 11, instead of the probability.

The recognition unit 9 processes a label string obtained from a speech of an unknown word by referring to the preselection table 10 and the probability table 11, and performs a recognition operation in two stages, to be stated later, to obtain a recognition result. The recognition result is displayed on a CRT 12, for example.

In fact, the elements of block 13 may be realized as software in a personal computer, e.g., PC XT manufactured by IBM corporation. The elements of block 13 may also be realized as hardware by adopting a configuration consisting of blocks shown with solid lines within block 13. These blocks correspond respectively to the functions of the software, which will be explained later in detail in the explanation of steps corresponding thereto with reference to FIG. 2A, 2B, or 3. For ease of understanding, the blocks shown with solid lines in FIG. 1 are illustrated with the same numbers as those of the steps corresponding thereto shown in FIG. 2A, 2B, or 3.

The elements of block 14 may be realized by a signal processing board added to a personal computer.

Next, training of the system will be explained with reference to FIGS. 2A and 2B. The system, which is for unspecified speakers, performs training based on speeches spoken by a plurality, for example ten to tens, of training speakers. The speakers sequentially input training data. In a particular embodiment, a speaker inputs a plurality of speeches, for example three speeches, at a time for each of the words $w_j$ in the vocabulary for recognition.

In training, a histogram h (i, j, k) for the label $f_i$ in the training data is obtained first in each of the blocks $b_{jk}$ in the work $w_j$. FIG. 2A illustrates a procedure for generating the histograms h (i, j, k). In FIG. 2A, at the beginning, the maximum speech length L(j), the minimum speech length l(j), and j for each of the words $w_j$ are initialized (Step 15). Namely, they are set to L(j)=∞, l(j) =+∞, and j =0, respectively.

Then, the CRT 12 (FIG. 1) displays an indication that the word $w_j$ be spoken three times (Step 16), and a speaker responds thereto. The A/D conversion, feature value extraction, and labelling are sequentially performed on the speeches (Steps 17–19). Thereafter, the maximum speech length L(j) and the minimum speech length l(j) are updated, if necessary (Step 20). Namely, in case the longest one of these three speeches is longer than the maximum speech length L(J), the value is set to a new maximum speech length L(j). Similarly, in case the shortest one of these three speeches is shorter than the minimum speech length l(j), the value is set to a new minimum speech length l(j).

Figure 4:
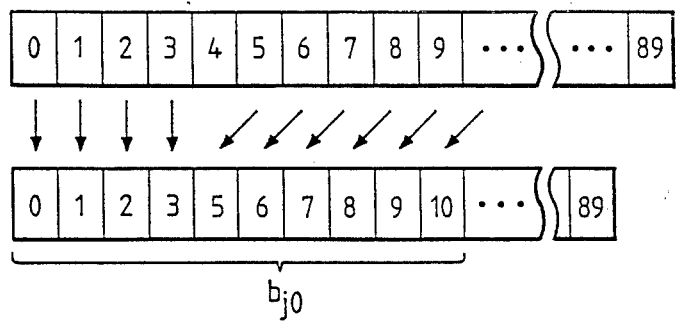
FIGS. 4, 5, 6, and 7 show diagrams for explaining the important portions shown in FIG. 2A and 2B
Figure 5:
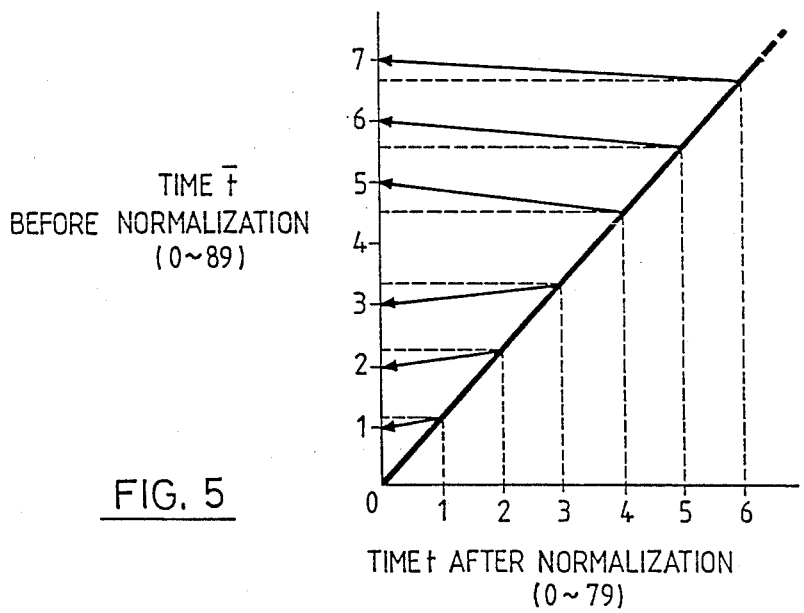

Next, a normalization of the speech length and a block segmentation will be performed for each of the speeches (of a word) (Steps 21 and 22). In the normalization of the speech length, the number of labels included in one speech is set to a predetermined number $N_f( = N_0 \times N_b$, where $N_0$ is a positive integer and $N_b$ is the number of blocks $b_{jk}$), so that the block segmentation could be performed easily. Of course, the block segmentation may be performed by using a unit smaller than a label. In that case, however, the calculation of histograms would be more complicated. In a particular example, the normalization is performed by setting the number of blocks, $N_b$, to 8 and the positive integer $N_0$ to 10, so that one speech includes 80 labels. This is illustrated in FIG. 4. The example illustrated in FIG. 4 shows a case where a word speech before the normalization of the speech length includes 90 labels. As seen from FIG. 4, some labels may be skipped as a result of the normalization. In a particular example, a label f(t) at a time t after the normalization to time (e.g., label) intervals 0 through 79 is equal to a label f($\bar{t}$) at a time $\bar{t}$ before the normalization, assuming $\bar{t}= \lfloor ( t \times 90)/ 80+0.5 \rfloor$, where $\lfloor \alpha \rfloor$ indicates that the figures of $\alpha$ below the decimal point should be omitted. The above formula may typically be illustrated as in FIG. 5. Generally, the formula may be expressed as $\bar{t}= \lfloor ( t\times \bar{N}_f) / N_f+0.5 \rfloor$, where $N_f$ is the number of labels after the normalization and $\bar{N}_f$ is the number of labels before the normalization. In FIG. 4, $\bar{N}_f$=90, and $\bar{N}_f > N_f$, although it may be that $\bar{N}_f \leq N_f$.

Figure 6:
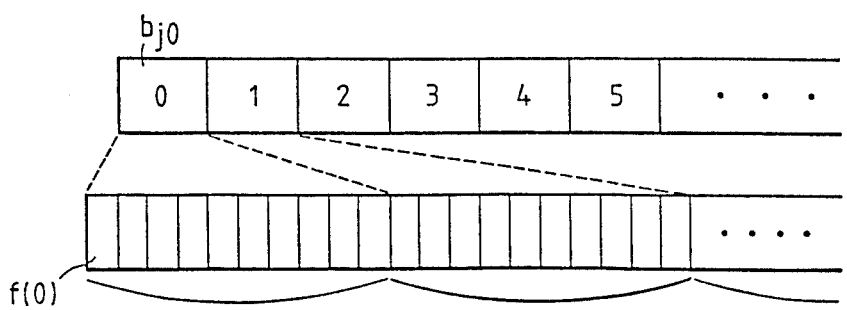

In the block segmentation, each of the speeches after the normalization is equally divided into the blocks $b_{jk}$, as illustrated in FIG. 6.

These Steps 16 through 23 are performed for all of the words $w_j$ in the vocabulary for recognition (Steps 24 and 25). The procedure of generating the histograms illustrated in FIG. 2A is shown for one speaker. By performing the procedure for a plurality of speakers, it is possible to generate the histograms h (i, j, k) which are not biased to any particular speaker.

Figure 2:
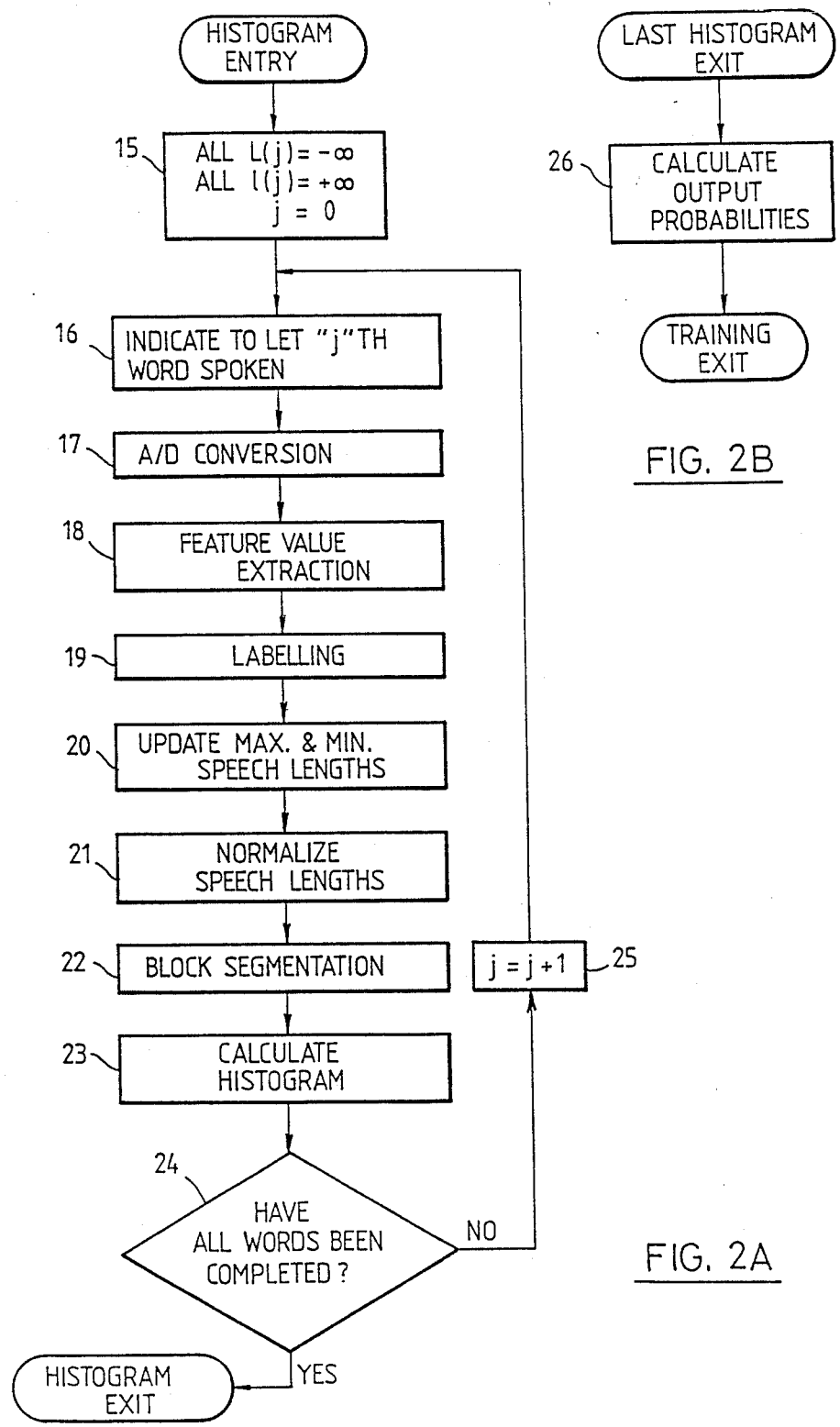
FIGS. 2A and 2B show flow charts for explaining the training unit 8 shown in FIG. 1.

After having generated the histograms h (i, j, k) which are not biased to any particular speaker as stated above, the histograms are normalized and the probability p (i, j, k) of the label $f_i$ being output in the block $b_{jk}$ in the word $w_j$ is calculated as illustrated in FIG. 2B (Step 26). The probability p (i, j, k) is obtained according to the following formula.

$$p(i, j, k) = \frac{h(i, j, k)}{\Sigma_i h(i, j, k)}$$

Figure 7:
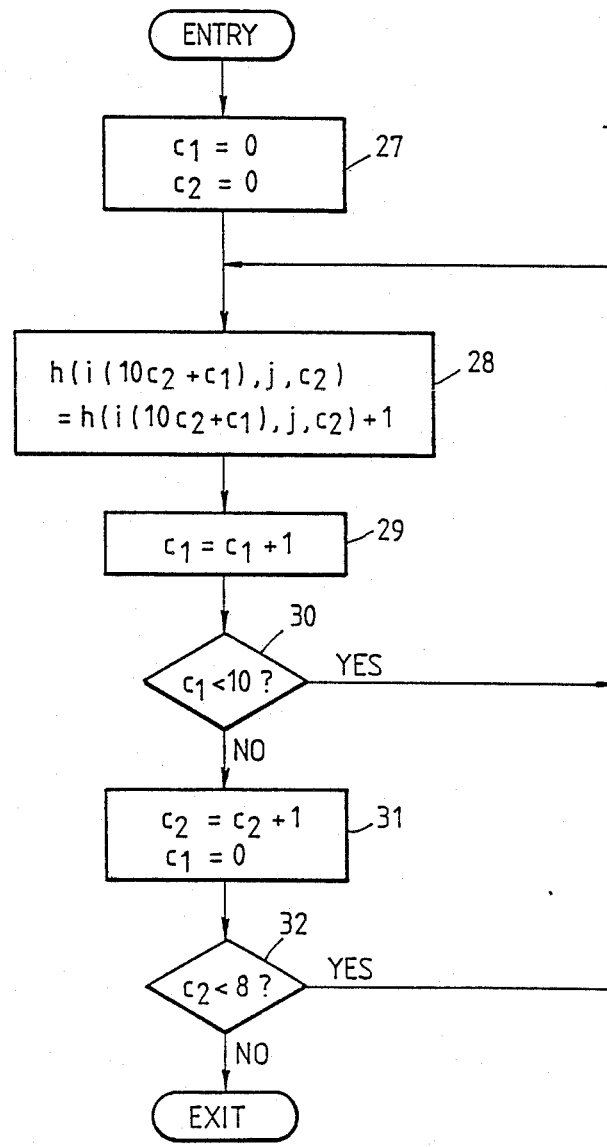

The block segmentation and the calculation of histograms in Steps 22 and 23, respectively, illustrated in FIG. 2A may be performed as illustrated in FIG. 7, for example. FIG. 7 shows a case where the number of blocks $b_{jk}$ is 8 and the number of labels $f_i$ in the block $b_{jk}$ is 10. In FIG. 7, $c_1$ and $c_2$ indicate the values of counters, each of which is set to 0 at the beginning (Step 27). The $c_1$ is incremented by one each time a label is reached (Step 29), and is reset to 0 when the counter has reached 10 (Step 31). The $c_2$ is incremented by one, each time the $c_1$ is reset (Step 31). With the end of each of the blocks $b_{jk}$ and the end of each of the speeches being discriminated in Steps 30 and 32, respectively, the histograms h (i (10$c_2$ +$c_1$), j, $c_2$) are incremented by one, every time $t = 10c_2 + c_1$. The $i(t)$ indicates the number of a label at the time t (t=0 through 79; the time units are intervals at which labels are produced).

Next, referring to FIG. 3, an explanation will be made as to the recognition of an unknown input unit.

Figure 3:
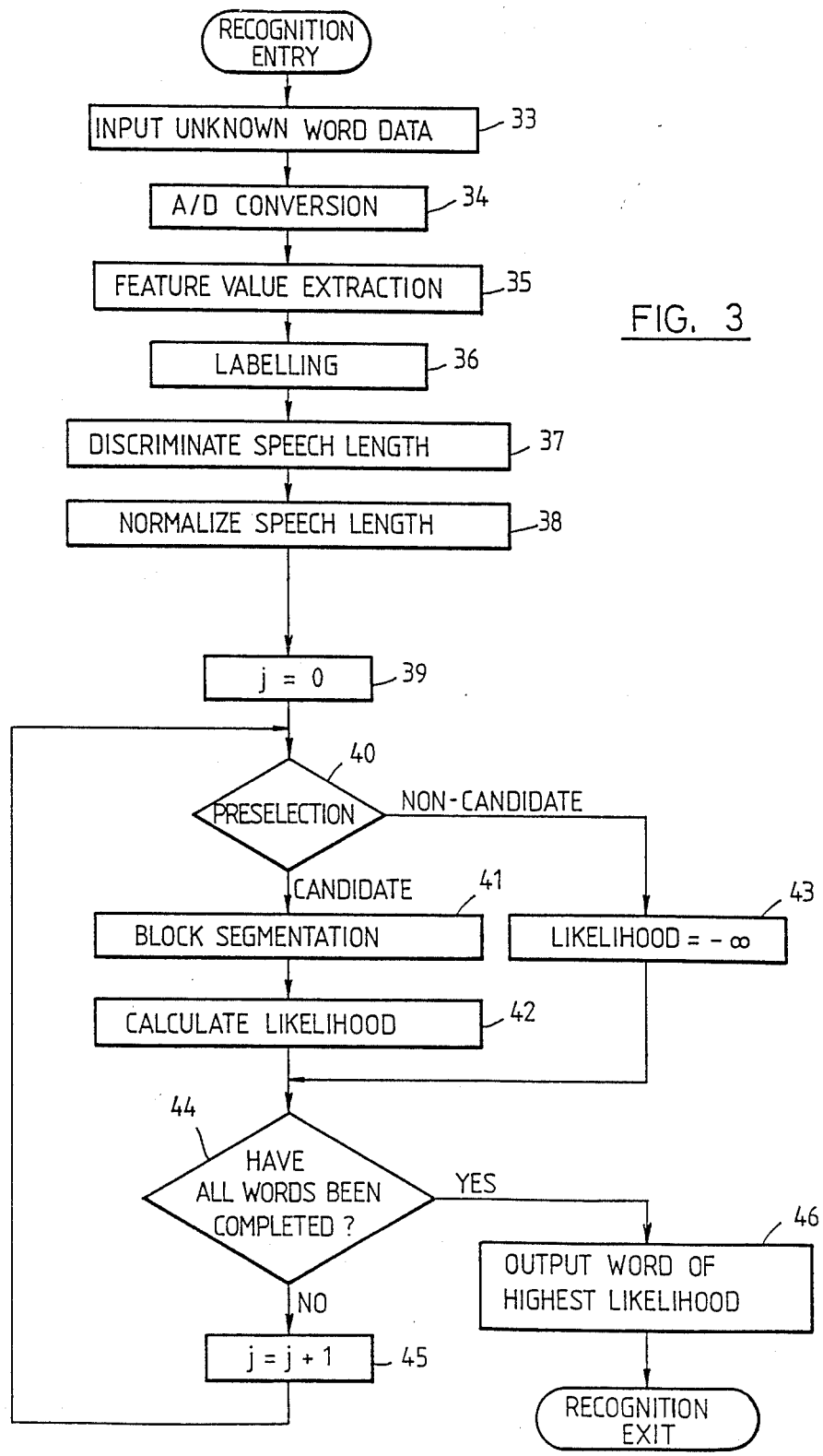
FIG. 3 shows a flow chart for explaining the recognition unit 9 shown in FIG. 1.

In FIG. 3, when the data of an unknown word x is input (Step 33), the A/D conversion, feature value extraction, and labelling are sequentially performed on the data (Steps 34, 35, and 36). Thereafter, the length of the speech of the unknown word x is discriminated (Step 37) and used in the subsequent preselection Step 40. The length of the speech of the unknown word x is normalized in the same manner as in Step 21 illustrated in FIG. 2A (Step 38).

Particularly, in the preselection step 40, it is discriminated whether or not the word $w_j$ satisfies the following formula, by referring to the preselection table 10 (FIG. 1).

$$l(j)\cdot(1-\text{delta}) < \text{Length}(x) < L(j)\cdot(1+\text{delta})$$

where the Length (x) denotes the length of the speech of the unknown word. The delta is a small value, for example 0.2. If this condition is not satisfied, the likelihood is set as $-\infty$ so that the word wj would be omitted from the candidates for the recognition result (Step 43). If the condition is satisfied, after the speech of the unknown word x is divided into the blocks $b_{jk}$ (step 41) in the same manner as in Step 22 illustrated in FIG. 2A, the likelihood is calculated (step 42). The likelihood LH (j) of the word $w_j$ being the unknown word x may be obtained according to the following formula.

$$LH = (j) = \sum_{t=0}^{T} \log p(i(t), j(t), k)$$

All the Steps 40 through 43 are performed for all of the words $w_j$ (Steps 39, 44, and 45) and the likelihoods LH (j) of all of the words $w_j$ are obtained. Then, a word having the highest likelihood LH (j) is output as the recognition result (Step 46).

It should be understood that the present invention is not limited to the above embodiment, but various changes in form and details may be made therein without departing from the spirit and scope of the invention. For example, while in the above embodiment, the present invention has been realized as software in a personal computer, it can, of course, be realized as hardware.

Further, while in the above embodiment, the present invention has been applied to speech recognition for unspecified speakers, such as used in banking systems, subway information systems and the like, it may also be applied to systems for specified speakers.

Further, smoothing may be performed in the present invention in order to improve the recognition accuracy. For example, in case a label output probability is 0, it may be replaced with a value in the order of $\epsilon = 10^{-7}$, or the histograms may be recalculated in consideration of confusions between labels.

As explained above, according to the present invention, label output probabilities can be expressed quite simply. Therefore, the present invention enables to perform training conveniently and reduce calculations at the time of recognition. Further, since errors due to fluctuations in time can be absorbed by adopting the probabilistic expressions, recognition errors can be suppressed.

Having thus described our invention, what we claim as new, and desire to secure by Letters Patent is:

1. A speech recognition system comprising:
    means for storing probabilities of each of a plurality of labels being produced in each of a plurality of first segments in each of a plurality of recognition units;
    means for generating a label string from an input unit;
    means for segmenting said label string into a plurality of second segments, each corresponding to each of said first segments;
    means for calculating, for each recognition unit, a likelihood that said input unit represents the recognition unit, by reading out from said storing means, for each of said labels in said label string, said probabilities of each of said labels associated with said one recognition unit and corresponding to each of said labels in said label string, according to the identity of each of said labels in said label string and the identity of each of said second segments to which each of said labels in said label string belongs;
    means for determining a recognition unit having the highest likelihood among said recognition units, as a recognition result, according to the outputs of said likelihood calculating means.

2. A speech system as described in claim 1 further comprising:
    means for preselecting candidates for said recognition result according to the length of said input unit.

3. A speech recognition system as described in claim 1 wherein:
    said likelihood calculating means obtains said likelihood by calculating the sum of the logarithms of said probabilities read out associated with said one recognition unit.

4. A speech recognition method comprising the steps of:
    (a) where each word Wj in a vocabulary is partitioned into a sequence of segments S1(Wj), S2(Wj),...,Sn(Wj), storing probabilities for each label of an alphabet of labels being produced at each segment of each vocabulary word;
    (b) generating a string of labels in response to an uttered speech input, each label in the string being selected from the label alphabet, said selection being based on predefined speech characteristics;
    (c) segmenting the generated string of labels into a sequence of segments s1,s2,...,sn aligned with the respective segments S1(Wj),S2(Wj),...,Sn(Wj) for each of the vocabulary words Wj;
    (d) calculating the likelihood of each vocabulary word producing the string of labels for the uttered input including the steps of:
        (i) reading out the respective probabilities for each label in the segment s1 which is stored for the segment S1(W1) for a word W1;
        (ii) repeating the step (i) for each label in each segment s2 through sn, one segment after another, in order to read out probabilities stored for corresponding segments S2(W1), S3(W1),...,Sn(W1);
        (iii) repeating steps (d) (i) and (d) (ii) for each word Wj; and
    (e) determining, based on the probabilities read out in step (d), which vocabulary word has the highest likelihood of having produced the generated string of labels for the input.

5. The method of claim 4 comprising the further steps of:
(f) training the probabilities stored in step (a) including the steps of:
  (i) generating at least one string of labels in response to at least one corresponding utterance of a known subject vocabulary word;
  (ii) for each generated string for the known word, normalizing the string to a length of $N_f$ labels;
  (iii) partitioning each normalized string of $N_f$ labels into $N_b$ segments $S1(Wj), S2(Wj),..., Sn(Wj)$ each segment having the same number $N_f/N_b$ of labels;
  (iv) determining counts, based on the label strings generated in response to the utterance of the known word, indicating how often each label occurred in each segment $S1(Wj)$ through $Sn(Wj)$; and
  (v) repeating steps (f) (i) through (f) (iv) for each vocabulary word.

6. The method of claim 5 comprising the further step of:
(g) normalizing the string of labels generated in response to an speech input to include $N_f$ labels which may be segmented into $N_b$ segments $s1$ through $sn$.

7. A speech recognition method comprising the steps of:
providing a vocabulary of at least two words $W_1$ and $W_2$;
partitioning word $W_1$ into a sequence of at least two segments $S_1(W_1)$ and $S_2(W_1)$;
partitioning word $W_2$ into a sequence of at least two segments $S_1(W_2)$ and $S_2W_2)$;
providing an alphabet of labels $f_i$;
generating probabilities $P(f_i|S_1(W_1))$ of occurrence of each label $f_i$ given the occurrence of the segment $S_1(W_1)$;
generating probabilities $P(f_{i'1}|s_2(W_1))$ of occurrence of each label $f_i$ given the occurrence of the segment $S_1(W_1)$;
generating probabilities $P(f_i|S_2(W_2))$ of occurrence of each label $f_i$ given the occurrence of the segment $S_2(W_1)$;
generating probabilities $P(f_i|S_2(W_2))$ of occurrence of each label $f_i$ *given the occurrence of the segment* $S1(W_2)$;
generating a sequence of labels $L_i(W_3), L_2(W_3), ..., L_m(W_3)$ representing an input speech $W_3$ to be recognized;
partitioning the sequence of labels representing input speech $W_3$ into a sequence of at least two segments $S_1(W_3)$ and $S_2(W_3)$ to produce a sequence of labels $L_i(S_1(W_3))$, $L_2(S_1(W_3))$, ..., $L_q(S_1(W_3))$, $L_{q+1}(S_2(W_3))$, $L_{q+2}(S_2(W_3))$, ..., $L_m(S_2(W_3))$;
calculating the likelihood of occurrence of word $W_1$ given the sequence of labels representing the input speech $W_3$, based on the probabilities $P(L_1(S_k(W_3))|S_k(W_1))$ of occurrence of the labels representing word $W_3$ given the occurrence of segment $S_k$ of word $W_1$;
calculating the likelihood of occurrence of word $W_2$ given the sequence of labels representing the input speech $W_3$, based on the probabilities $P(L_i(S_k(W_3))|S_k(W_2))$ of occurrence of the labels representing word $W_3$ given the occurrence of segment $S_k$ of word $W_2$;
generating an output signal identifying the input speech $W_3$ as the word $W_1$ or $W_2$ with the higher calculated likelihood of occurrence.

8. A method as claimed in claim 7, characterized in that:
the step of calcalating the likelihood of occurrence of word $W_1$ comprises the step of calculating the sum of the logarithms of the probabilities $P(L_1(S_k(W_3))|S_k(W_1))$ of occurrence of the labels representing word $W_3$ given the occurrence of segment $S_k$ of word $W_1$; and
the step of calculating the likelihood of occurrence of word $W_2$ comprises the step of calculating the sum of the logarithms of the probabilities $P(L_i(S_k(W_3))|S_k(W_2))$ of occurrence of the labels representing word $W_3$ given the occurrence of segment $S_k$ of word $W_2$.

9. A method as claimed in claim 7, further comprising the steps of:
generating maximum and minimum speech length information for word $w_1$;
generating maximum and minimum speech length information for word $W_2$;
determining the length of word $W_3$;
setting the likelihood of occurrence of word $W_1$ substantially equal to zero if the length of word $W_3$ is (i) greater than the maximum speech length information for word $W_1$, or (ii) less than the minimum speech length information for word $W_1$; and
setting the likelihood of occurrence of word $W_2$ substantially equal to zero if the length of word $W_3$ is (i) greater than the maximum speech length information for word $W_2$or (ii) less than the minimum speech length information for word $W_2$.

10. A speech recognition system having a vocabulary of at least two words $W_1$ and $W_2$, and having an alphabet of labels $f_i$, word $W_1$ being partitioned into a sequence of at least two segments $S_1(W_1)kl$ and $S_2(W_1)$, word $W_2$ being partitioned into a sequence of at least two segments $S_1(W_2)$ and $S_2(W_2)$, said system comprising:
means for generating probabilities $P(f_i|S_1(W_1))$ of occurrence of each label $f_i$ given the occurrence of the segment $S_1(W_1)$;
means for generating probabilities $P(f_i|S_2(W_1))$ of occurrence of each label $f_i$ given the occurrence of the segment $S_2(W_1)$;
means for generating probabilities $P(f_i|S_1(W_2))$ of occurrence of each label $f_i$ given the occurrence of the segment $S_1(W_2)$;
means for generating probabilities $P(f_i|S_2(W_2))$ of occurrence of each label $f_i$ given the occurrence of the segment $S_2(W_2)$;
means for generating a sequence of labels $L_1(W_3), L_2(W_3), ..., L_m(W_3)$ representing an input speech $W_3$ to be recognized;
means for partitioning the sequence of labels representing input speech $W_3$ into a sequence of at least two segments $S_1(W_3)$ and $S_2(W_3)$ to produce a sequence of labels $L_1(S_1(W_3))$, $L_2(S_1(W_3))$, ..., $L_q(S_1(W_3))$, $L_{q+1}(S_2(W_3))$, $L_{q2}(S_2(W_3))$, ..., $L_m(S_2(W_3))$;
means for calculating the likelihood of occurrence of word $W_1$ given the sequence of labels representing the input speech $W_3$, based on the probabilities $P(L_i(S_k(W_3))|S_k(W_1))$ of occurrence of the labels representing word $W_3$ given the occurrence of segment $S_k$ of word $W_1$;

means for calculating the likelihood of occurrence of word $W_2$ given the sequence of labels representing the input speech $W_3$, based on the probabilities $P(L_i(S_k(W_3))|S_k(W_2))$ of occurrence of the labels representing word $W_3$ given the occurrence of segment $S_k$ of word $W_2$;

means for generating an output signal identifying the input speech $W_3$ as the word $W_1$ or $W_2$ with the higher calculated likelihood of occurrence.

11. A system as claimed in claim 10, characterized in that:

the means for calculating the likelihood of occurrence of word $W_1$ comprises means for calculating the sum of the logarithms of the probabilities $P(L_i(S_k(W_3))|S_k(W_1))$ of occurrence of the labels representing word $W_3$ given the occurrence of segment $S_k$ of word $W_1$; and the means for calculating the likelihood of occurrence of word $W_1$ comprises means for calculating the sum of the logarithms of the probabilities $P(L_i(S_k(W_3))|S_k(W_2))$ of occurrence of the labels representing word $W_3$ given the occurrence of segment $S_k$ of word $W_2$.

12. A system as claimed in claim 10, further comprising:

means for generating maximum and minimum speech length information for word $W_1$;

means for generating maximum and minimum speech length information for word $W_2$;

means for determining the length of word $W_3$; and means for setting the likelihood of occurrence of word $W_1$ substantially equal to zero if the length of word $W_3$ is (i) greater than the maximum speech length information for word $W_1$, or (ii) less than the minimum speech length information for word $W_1$; and means for setting the likelihood of occurrence of word $W_2$ substantially equal to zero if the length of word $W_3$ is (i) greater than the maximum speech length information for word $W_2$, or (ii) less than the minimum speech length information for word $W_2$.

* * * * *

UNITED STATES PATENT AND TRADEMARK OFFICE
CERTIFICATE OF CORRECTION

PATENT NO. : 4,876,720
DATED : October 24, 1989
INVENTOR(S) : Toyohisa Kaneko, et al It is certified that error appears in the above-indentified patent and that said Letters Patent is hereby corrected as shown below:

ATTACHMENT A

SPEECH RECOGNITION SYSTEM

ABSTRACT

The likelihood of the unknown input word being one of the reference words is calculated based on the probabilities obtained for each label of the stream in response to the identities of the label concerned, the segment to which the label concerned belongs, and the one reference word. The reference word having the highest likelihood is determined as the recognition result.

UNITED STATES PATENT AND TRADEMARK OFFICE
CERTIFICATE OF CORRECTION

PATENT NO. : 4,876,720
DATED : October 24, 1989
INVENTOR(S) : Toyohisa Kaneko, et al It is certified that error appears in the above-indentified patent and that said Letters Patent is hereby corrected as shown below:

```
Speech recognition based on a probabilistic tech-
nique is provided, which requires less processing
time than a hidden Markov model type recognizer. A
label output probability is defined as the probabil-
ity of the label concerned being produced at each
segment of each referent word. Such probabilities
are easily obtained from label histograms each being
computed for each segment of each reference word
during training. In decoding, the label stream
produced from an unknown input word, is divided into
the same number of segments as the reference words.
```

Signed and Sealed this

Thirteenth Day of June, 1995

Attest:

BRUCE LEHMAN

*Attesting Officer*  *Commissioner of Patents and Trademarks*